INVENTOR
B. M. OLIVER
BY Hugh S. Wertz
ATTORNEY

Dec. 26, 1950 B. M. OLIVER 2,535,810

MINIMIZING ELECTRON OPTICAL DISTORTIONS
IN ELECTRON CAMERA TUBES

Filed Aug. 26, 1947 5 Sheets-Sheet 2

INVENTOR
B. M. OLIVER
BY Hugh S. Wertz
ATTORNEY

INVENTOR
B. M. OLIVER
BY Hugh S. Wertz
ATTORNEY

INVENTOR
B. M. OLIVER
BY Hugh S. Wertz
ATTORNEY

INVENTOR
B. M. OLIVER
BY Hugh S. Wertz
ATTORNEY

Patented Dec. 26, 1950

2,535,810

UNITED STATES PATENT OFFICE 2,535,810

MINIMIZING ELECTRON OPTICAL DISTORTIONS IN ELECTRON CAMERA TUBES

Bernard M. Oliver, New York, N. Y., assignor to Bell Telephone Laboratories, Incorporated, New York, N. Y., a corporation of New York Application August 26, 1947, Serial No. 770,639

5 Claims. (Cl. 315—31)

This invention relates primarily to television transmitting apparatus and more specifically to arrangements including electron camera tubes of the dissector type.

It is an object of this invention to reduce certain distortions heretofore generally produced in television transmitter arrangements employing tubes of the dissector type.

One well-known form of cathode ray television pick-up device is called the dissector. In the usual dissector tube, an image of the object is formed on a photoelectric cathode, thereby giving rise to a stream of electrons, various elemental portions of a cross-section of which, taken at a plane containing a scanning aperture in front of a pick-up electrode, correspond respectively to the elemental areas of the optical image on the cathode. The electrons are accelerated towards the scanning aperture by an axial electrostatic field. In order to use the tube as a television pick-up device, three independently variable magnetic fields are usually necessary. First, an axial magnetic field is required to form an electron image at the end of the tube remote from the photocathode. Next, two transverse magnetic fields, known as the horizontal and vertical deflecting (or sweep) fields, are required in order to deflect the electron stream from side to side and up and down and thus displace the electron image in these directions. By means of these two transverse magnetic fields it is possible to move all elemental parts of the electron image in succession over a fixed aperture located in the image or "scanning" plane. The number of electrons received by an electrode directly behind the aperture depends on the electron density of that portion of the electron image which falls on the aperture, and hence in turn is proportional to the light intensity falling on the corresponding element of the cathode surface. In certain special applications, such as those in which the material to be scanned is a moving film, one deflecting field may be omitted. In television systems employing the usual dissector tube as a pick-up device, it has been noted that the picture produced on the screen of the receiving tube has been distorted due, at least in part, to the fact that the magnetic sweep coils and, in some cases, the focussing coil and also the electrode structure producing the electrostatic field in the dissector have been so formed as to produce non-uniform fields. However, even if all the fields are made uniform, there are residual distortions in the picture. The present invention, in one of its primary aspects, is concerned with the reduction of these latter distortions. One form of such distortion is known as "S" distortion and is easily observed on the screen of a receiving tube used to reproduce an image of the scanned object. This type of distortion gets its name from the fact that the outside of the image is twisted with respect to the inside. Another type of distortion is called barrel or pin-cushion distortion and can be easily recognized on the screen of the receiving tube because the image field is in the shape of a pin-cushion or barrel. Another type of distortion is a blurring at the edges and corners of the picture due to defocussing of the image as it is deflected.

It has been found that the geometric distortions produced in the dissector type tube can be eliminated or greatly minimized by using substantially uniform accelerating, focussing and deflecting fields and by either (1) modulating the electric field by a factor proportional to the sum of the squares of the two deflecting fields, or by (2) modulating both the focussing and deflecting fields by a factor proportional to the sum of the squares of these two deflecting fields.

In accordance with an illustrative embodiment of invention employing the first of these two methods of correction, a balanced voltage is derived which is proportional to the vertical sweep field intensity and this voltage is applied to a vacuum tube device (termed a "squarer" device) operating on a curved portion of its characteristic in such a manner that its output current is proportional to the square of the applied voltage. Similarly, a balanced voltage is developed which is proportional to the horizontal sweep field intensity and this voltage is applied to a second squarer device. The outputs of the two squares are added and amplified to obtain a voltage proportional to the sum of the squares of the two deflecting fields. Since the deflecting fields are at right angles to each other, this voltage is proportional to the quare of the total deflecting field. A fraction of this voltage is applied to each of the beam accelerating rings in a dissector of the type in which the accelerating rings are placed at progressively higher potentials in the direction of electron movement, causing their potentials to vary in such a manner that while the electric field in the dissector is always substantially uniform throughout the useful volume, the intensity of this field is increased during deflection of the image by an amount proportional to the square of the deflection. It will be shown mathematically below how this acts to greatly reduce geometric distortions produced in the tube.

In an illustrative embodiment of the invention which makes use of the second method of correction, both focussing and deflecting fields are modulated by a factor proportional to the sum of the squares of the two deflecting fields. This is accomplished by using the outputs of the squarer devices already described to amplitude-modulate the sweep currents in both deflection coils and at the same time to modulate the intensity of the focussing field by varying the current in the main or in an auxiliary focussing coil.

The invention will be more readily understood by referring to the following description taken in connection with the accompanying drawings forming a part thereof in which.

Figure 1:
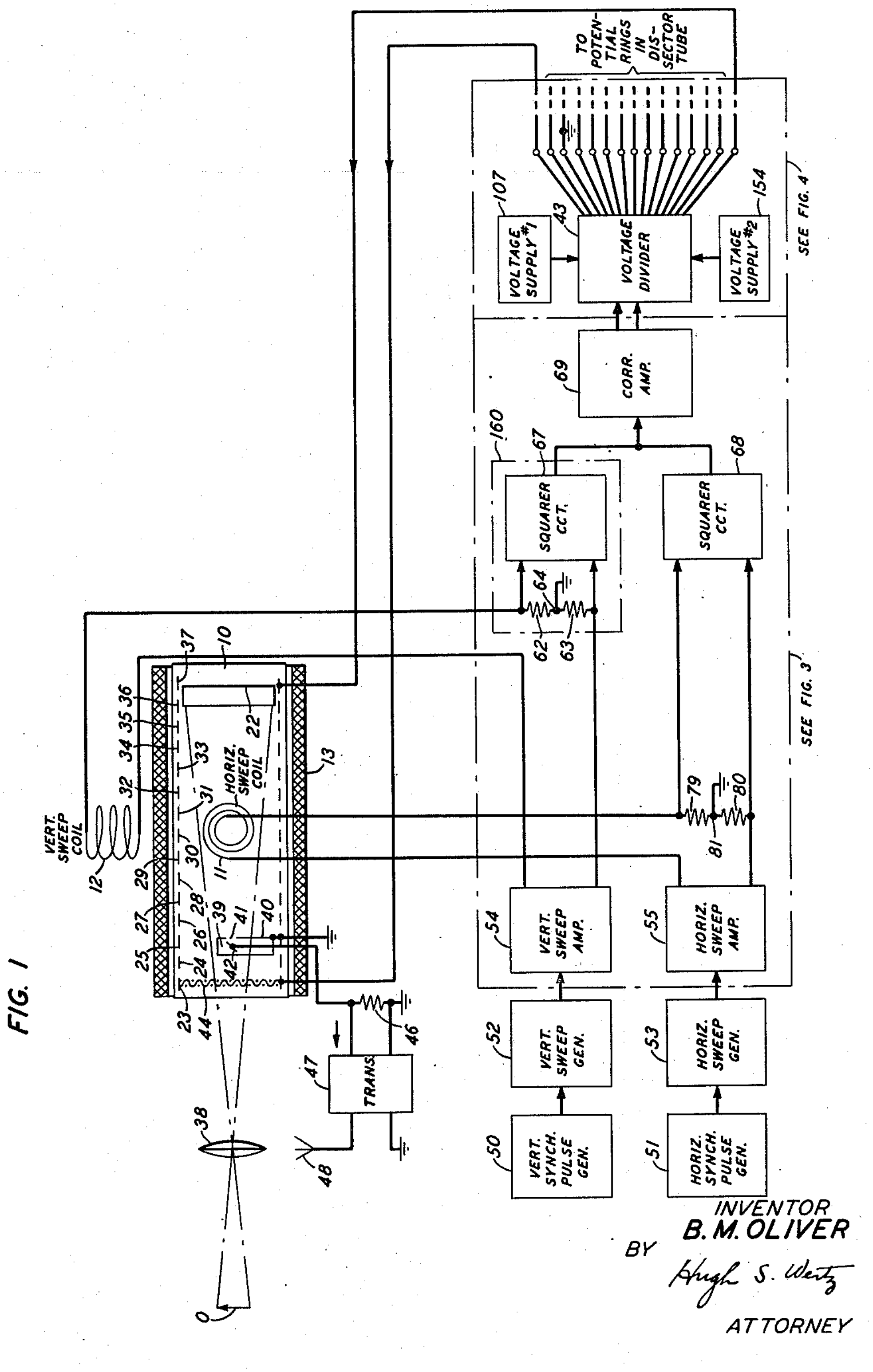
Fig. 1 is a schematic view of a television transmitter arrangement in accordance with the invention.
Figure 2:
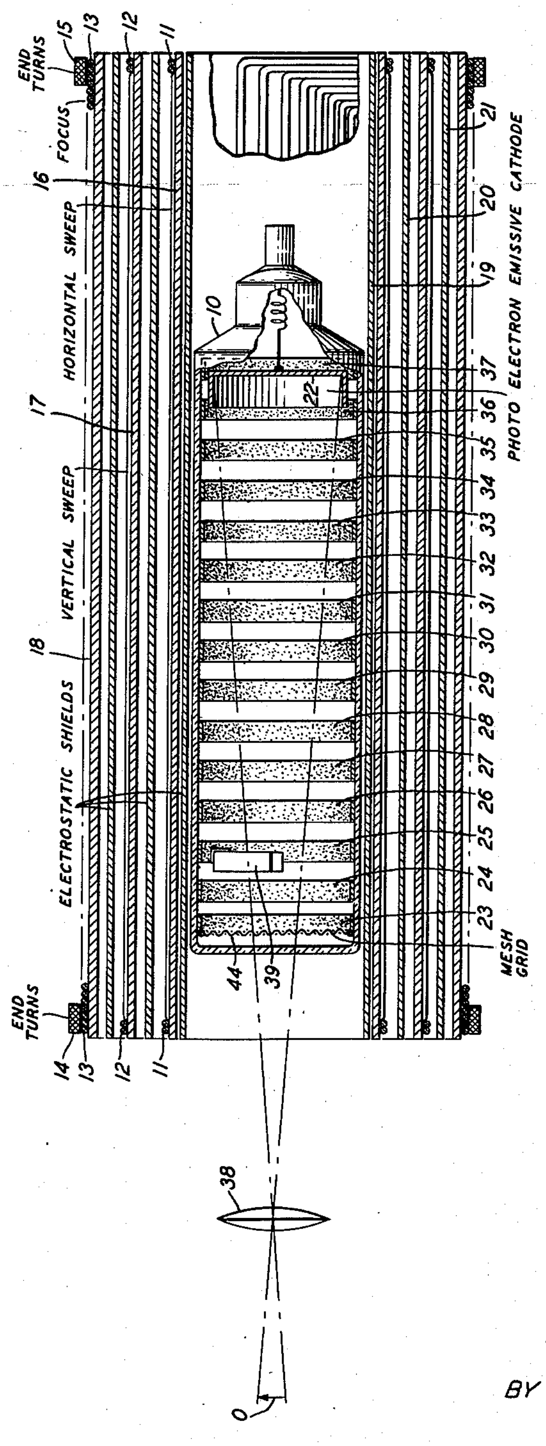
Fig. 2 is an enlarged elevation view, with portions broken away, of the dissector tube included in the arrangement of Fig. 1 and its associated sweep and focussing windings.
Figure 7:
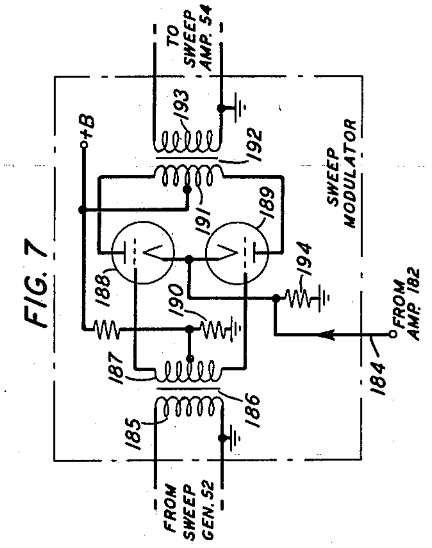
Fig. 7 is a circuit diagram of a modulator which can be used in the circuit of Fig. 6.

Referring more specifically to the drawings, Fig. 1 shows schematically a television transmitter station including a dissector tube 10 while Fig. 2 shows (in enlarged form) the dissector tube 10 (with portions broken away) and associated horizontal sweep winding 11, vertical sweep winding 12 and focussing winding 13, which windings are preferably formed and wound in the manner shown in Fig. 7 of B. M. Oliver Patent 2,278,478, issued April 7, 1942, so that a substantially uniform magnetic field is produced within the space enclosed by the dissector 10. To assist in the production of a uniform magnetic focussing field, particularly at the ends of the dissector, additional end turns 14 and 15, the purpose of which is well understood by the workers in the art, have been added at the ends of the focussing winding 13. The winds 11, 12 and 13 are supported on suitable forms 16, 17 and 18, respectively, and the various windings are shielded by means of cylindrical electrostatic shields 19, 20 and 21, respectively.

The dissector tube 10 comprises a photoelectric cathode 22 upon which radiations from an object O are focussed by any suitable optical system represented schematically by the single lens 38, an electrostatic accelerating field producing means comprising a plurality of conducting rings 23 to 37, inclusive, and a pick-up member 39 at the end of the tube 10 remote from the photoelectric cathode 22. The pick-up member 39 preferably comprises a metallic finger 40 having an aperture 41 therein of elemental size and an anode 42 back of the aperture for receiving electrons which pass through it. Any suitable electron multiplier (not shown) may be enclosed within the pick-up member 39. In order that the electric field, which accelerates the photoelectrons from the cathode 22 towards the anode 42 in the member 39, be uniform in intensity and axial in direction, the conducting rings 23 to 37, inclusive, are connected respectively to points of different potential on the voltage divider 43 which is shown in detail in Fig. 4. The divider 43, the circuit arrangement of which will be described more fully below, is so arranged that the potentials of the respective rings 23 to 37, inclusive are increasingly larger in the direction of the electron flow. A mesh cap 44 on or near the end wall of the tube 10 is placed at the same potential as the ring 23. The metallic finger 40 is placed at ground potential which is also made the potential of the nearest ring member 25. The anode 42 is connected through resistor 46 to ground. The terminals of the resistor 46 are connected to a transmitter 47 wherein the output signals of the dissector 10 are prepared for radiation, by means of the sending antenna 48, to a receiving station.

Before explaining in detail the manner in which sweep waves are applied to the horizontal and vertical sweep windings, and alternating components applied to the various potential rings 23 to 37, inclusive, in the dissector tube 10, the electron optics of the dissector tube will be considered in a mathematical discussion given at this point.

The electron optics of this device is extremely complicated for the general case of inhomogeneous electric and magnetic fields and, so far as is known, has never been completely solved. For the case of uniform fields throughout the volume of the dissector, however, manageable expressions for the electron trajectories can be obtained and a complete solution for the behavior of the device can be worked out. This has been done and the results are summarized below. In the following analysis:

$x, y, z$ are instantaneous coordinates of the electron,
$f$=force on the electron,
$m$=mass of the electron,
$v$=velocity of the electron,
$e$=charge of the electron,
E=electric field strength,
H=magnetic field strength,
$t$=time,
$q$ represents any coordinate ($x$ or $y$ or $z$)
$\alpha$= a proportionality constant,
Subscript T indicates terminal conditions (in image plane),
A dot over a symbol indicates the first derivative of that quantity with respect to time,
Two dots over a symbol indicate the second derivative of that quantity with respect to time,
Subscripts $x$, $y$ or $z$ used with a symbol indicate that the quantity exists in the $x$, $y$ or $z$ direction, and a bar over a quantity indicates the average value of that quantity, or that the quantity is a vector.

Figure 8:
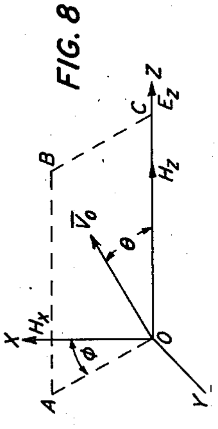
Fig. 8 is a diagrammatic and graphical representation to aid in understanding the invention.

The coordinate system used and initial conditions assumed are shown in Fig. 8. In that coordinate system, the XY plane is the plane of the photo-cathode 22 and the Z-axis is parallel to the longitudinal axis of the tube 10. Because all the fields are assumed to be uniform, the origin of the coordinate system need not lie on the axis of the tube, but can be taken as coincident with any desired point on the photocathode where emission is produced. Also because of the uniformity of the fields, it suffices to consider only one deflecting field, since the two deflecting fields can everywhere be replaced by their resultant (another uniform transverse field). The coordinate system is assumed to be so rotated that this resultant field lies parallel to the X-axis. The plane OABC, which makes an angle $\theta$ with the XZ plane, contains the vector representing the initial velocity. In other words the direction of the initial velocity makes an angle $\theta$ with the Z-axis and lies in a plane making an angle $\Phi$ with the XZ plane.

The first step in the solution consists in finding the time-parametric equations of position of an electron emitted at $t=0$, $x=0$, $y=0$, and $z=0$, with arbitrary initial velocity $$\bar{v}=\bar{i}\dot{x}_0+\bar{j}\dot{y}_0+\bar{k}\dot{z}_0.\ (\dot{z}_0\geq 0)$$

The equations of motion of the electron in the fields $E_z$, $H_z$ and $H_x$ are:

$$f_x=m\ddot{x}=eH_z\dot{y} \quad (1)$$

$$f_y=m\ddot{y}=e(H_x\dot{z}-h_z\dot{x}) \quad (2)$$

$$f_z=m\ddot{z}=e(E_z=H_x\dot{y}) \quad (3)$$

The electron charge, $e$, in these equations is negative. In the actual case, therefore, $E_z$ will also be negative.

Making use of the initial conditions that at $t=0$, $$\begin{Bmatrix} x=0,\ y=0,\ z=0 \\ \dot{x}=\dot{x}_0,\ \dot{y}=\dot{y}_0,\ \dot{z}=\dot{z}_0 \end{Bmatrix}$$

these equations may be solved to give the equations for the electron position as a function of time. Thus, letting $$H^2=H_x^2+H_z^2$$

$$x=\dot{x}_0t+\frac{H_z}{H}\left[\frac{H_x\dot{z}_0-H_z\dot{x}_0}{H}\left(t-\frac{m}{eH}\sin\frac{eH}{m}t\right)+\dot{y}_0\frac{m}{eH}\left(1-\cos\frac{eH}{m}t\right)\right]$$
$$+\frac{H_xH_z}{H^2}E_z\frac{e}{m}\frac{t^2}{2}-\frac{H_xH_z}{H^3}E_z\frac{m}{eH}\left(1\ \cos\frac{eH}{m}t\right) \quad (4)$$

$$y=\frac{H_x\dot{z}_0-H_z\dot{x}_0}{H}\sin\frac{eH}{m}t+\dot{y}_0\cos\frac{eH}{m}t+\frac{H_xE_z}{H^2}\left(1-\cos\frac{eH}{m}t\right) \quad (5)$$

$$z=\dot{z}_0t-\frac{H_x}{H}\left[\frac{H_x\dot{z}_0-H_z\dot{x}_0}{H}\left(t-\frac{m}{eH}\sin\frac{eH}{m}t\right)-\dot{y}_0\frac{m}{eH}\left(1-\cos\frac{eH}{m}t\right)\right]$$
$$+\frac{H_z^2}{H^2}E_z\frac{e}{m}\frac{t^2}{2}-\frac{H_x^2}{H^3}E_z\frac{m}{eH}\left(1-\cos\frac{eH}{m}t\right) \quad (6)$$

Now let $$\frac{eH}{m}=\omega$$

T=transit time to image plane
$T_0$=transit time to image plane with $\dot{}_0=0$, $H_x=0$
$d$=distance to image plane
$V=E_zd$=potential difference between cathode and image plane
$\dot{z}_V$=terminal velocity with $H_x=0$ and $v_0=0$.

From Equation 6; setting $\dot{z}_0=0$ and $H_x=0$ $$z=E_z\frac{e}{m}\frac{t^2}{2}$$

$$\dot{z}=E_z\frac{e}{m}t$$

Thus $$\left.\begin{aligned} d&=E_z\frac{e}{m}\frac{T_0^2}{2} \\ \dot{z}_V&=E_z\frac{e}{m}T_0 \end{aligned}\right]$$

from which:

$$\left[\begin{aligned} \dot{z}_V&=\sqrt{2\frac{e}{m}V} \\ T_0&=\frac{2d}{\dot{z}_V} \end{aligned}\right.$$

The trajectory equations may now be written:

$$x=\dot{x}_0t+\frac{H_z}{H}\left[\frac{H_x\dot{z}_0-H_z\dot{x}_0}{H}\left(t-\frac{1}{\omega}\sin\omega t\right)+\frac{\dot{y}_0}{\omega}(1-\cos\omega t)\right]+\frac{H_xH_z}{H^2}\left[d\left(\frac{t}{T_0}\right)^2-\frac{E_z}{H}(1-\cos\omega t)\right] \quad (7)$$

$$y=\frac{1}{\omega}\left[\frac{H_x\dot{z}_0-H_z\dot{x}_0}{H}(1-\cos\omega t)+\dot{y}_0\sin\omega t\right]+\frac{H_x}{H}\left[\frac{E_z}{H}t-\frac{E_z}{\omega H}\sin\omega t\right] \quad (8)$$

$$z=\dot{z}_0t-\frac{H_x}{H}\left[\frac{H_x\dot{z}_0-H_z\dot{x}_0}{H}\left(t-\frac{1}{\omega}\sin\omega t\right)-\frac{\dot{y}_0}{\omega}(1-\cos\omega t)\right]+\frac{H_z^2}{H^2}d\left(\frac{t}{T_0}\right)^2-\frac{H_x^2}{H^2}\frac{E_z}{\omega H}(1-\cos\omega t) \quad (9)$$

If the picture is to be nearly in focus (first or primary forms) then $\omega T\cong 2\pi$. Accordingly, in the image plane, $$\sin\omega T\cong\omega T-2\pi$$

$$1-\cos\omega T\cong 0$$

$$T-\frac{1}{\omega}\sin\omega T\cong\frac{2\pi}{\omega}$$

and the terminal coordinates are given by:

$$x_T=\left(1-\frac{H_z^2}{H^2}\frac{2\pi}{\omega T}\right)\dot{x}_0T+\frac{H_xH_z}{H^2}\frac{2\pi}{\omega T}\dot{z}_0T+d\frac{H_xH_z}{H^2}\left(\frac{T}{T_0}\right)^2$$

$$y_T=\left(1-\frac{2\pi}{\omega T}\right)\dot{y}_0T+\frac{H_xE_z}{H^2}\frac{2\pi}{\omega}$$

where T satisfies the relation:

$$d=\left(1-\frac{H_x^2}{H^2}\frac{2\pi}{\omega T}\right)\dot{z}_0T+\frac{H_xH_z}{H^2}\frac{2\pi}{\omega T}\dot{x}_0T+d\frac{H_z^2}{H^2}\left(\frac{T}{T_0}\right)^2$$

Making further use of the relations given above, these equations may be written:

$$x_T=d\left[2\left(\frac{T}{T_0}-\frac{H_z^2}{H^2}\frac{2\pi}{\omega T_0}\right)\frac{\dot{x}_0}{\dot{z}_V}+2\frac{H_xH_z}{H^2}\frac{2\pi}{\omega T_0}\frac{\dot{z}_0}{\dot{z}_V}+\frac{H_xH_z}{H^2}\left(\frac{T}{T_0}\right)^2\right]$$

$$y_T=d\left[2\left(\frac{T}{T_0}-\frac{2\pi}{\omega T_0}\right)\frac{\dot{y}_0}{\dot{z}_V}+2\frac{H_x}{H}\frac{2\pi}{(\omega T_0)^2}\right]$$

where $$\frac{T}{T_0}$$

satisfies the equation:

$$d=$$

$$d\left[2\left(\frac{T}{T_0}-\frac{H_x^2}{H^2}\frac{2\pi}{\omega T_0}\right)\frac{\dot{z}_0}{\dot{z}_V}+2\frac{H_xH_z}{H^2}\frac{2\pi}{\omega T_0}\frac{\dot{x}_0}{\dot{z}_V}+\frac{H_z^2}{H^2}\left(\frac{T}{T_0}\right)^2\right]$$

These equations may be solved $$\left(\frac{T}{T_0}\text{ eliminated}\right)$$

and the results simplified, making use of the fact that usually $$\frac{H_x}{H}<\frac{1}{5}$$

$$\frac{\dot{y}_0}{\dot{z}_V}>\frac{1}{10}$$

The following approximate expressions are thus obtained for $x_T$ and $y_T$:

$$x_T=d\frac{H_x}{H_z}+2d\left[\left(\frac{H}{H_z}-\frac{2\pi}{\omega T_0}\right)\frac{\dot{x}_0}{\dot{z}_V}-\frac{\dot{x}_0\dot{z}_0}{\dot{z}_V^2}\right]$$

$$y_T=\frac{d}{\pi}\frac{H_x}{H}\left(\frac{2\pi}{\omega T_0}\right)^2+2d\left[\left(\frac{H}{H_z}-\frac{2\pi}{\omega T_0}\right)\frac{\dot{y}_0}{\dot{z}_V}-\frac{\dot{y}_0\dot{z}_0}{\dot{z}_V^2}\right]$$

The first term in each of the above equations does not contain the initial velocities, and therefore represents the deflection produced on an electron having zero initial velocity. It is also nearly the mean or average deflection of all electrons. About this mean or average deflection there is a dispersion due to the initial velocities given by the second term. The image field distortion is therefore contained in the first terms and the defocussing effects in the second. Accordingly, we may for convenience write $$x_T=\bar{x}_T+\zeta$$

$$y_T=\bar{y}_T+\eta$$

where $$\bar{x}_T=d\frac{H_x}{H_z},\ \zeta=2d\left[\left(\frac{H}{H_z}-\frac{2\pi}{\omega T_0}\right)+\frac{\dot{z}_0}{\dot{z}_V}\right]\frac{\dot{x}_0}{\dot{z}_V}$$

$$\bar{y}_T=\frac{d}{\pi}\frac{H_x}{H}\left(\frac{2\pi}{\omega T_0}\right)^2,\ \eta=2d\left[\left(\frac{H}{H_z}-\frac{2\pi}{\omega T_0}\right)+\frac{\dot{z}_0}{\dot{z}_V}\right]\frac{\dot{y}_0}{\dot{z}_V}$$

Thus for the mean total deflection, $\bar{r}_T$:

$$\bar{r}_T^2=\bar{x}_T^2\bar{y}_T^2$$

$$\bar{r}_T=dH_x\left[\frac{1}{H_z^2}+\frac{1}{\pi^2}\frac{1}{H^2}\left(\frac{2\pi}{\omega T_0}\right)^4\right]^{\frac{1}{2}}$$

$$\tan\delta=\frac{\bar{y}_T}{\bar{x}_T}=\frac{1}{\pi}\left[\frac{H_z}{H}\left(\frac{2\pi}{\omega T_0}\right)^2\right]$$

and for the radial dispersion, $\rho$, $$\rho^2=\zeta^2+\eta^2$$

$$\rho=2d\left[\left(\frac{H}{H_z}-\frac{2\pi}{\omega T_0}\right)-\frac{v_0\cos\theta}{\dot{z}_V}\right]\frac{v_0\sin\theta}{\dot{z}_V}$$

It will be noted that the deflection produced is not perpendicular to the deflecting field as might be expected, but makes an angle $\delta$ with the XZ plane whose tangent is $$\frac{1}{\pi}$$

approximately.

If $\bar{r}_T$ is not linearly proportional to $H_x$, there will be barrel or pin-cushion distortion; if $\tan\delta$ is not constant, there will be S-distortion, and if the factor between brackets in the expression for $\rho$ is not constant, there will be defocussing produced by the deflection. This is the case if both $H_z$ and $E_z$ are held constant under deflection, and all three defects exist.

*(a) Correction of geometric distortion (first method)*

If $H_z$ is constant, $\bar{x}_T$ will be proportional to $H_x$. If $\bar{y}_T$ were also proportional to $H_x$, there would be no geometric distortion. For this to be true, $H(\omega T_0)^2$ must be constant (independent of $H_x$).

$$\omega T_0=\frac{eH}{m}\frac{2d}{\sqrt{2\left(\frac{e}{m}\right)V}}$$

$$H(\omega T_0)^2=2d^2\frac{e}{m}\frac{H^3}{V}$$

For $H(\omega T_0)^2$ to be constant, $$\frac{H^3}{V}$$

must be constant.

$$H^2=H_z^2+H_x^2=H_z^2\left(1+\frac{H_x^2}{H_z^2}\right)$$

$$H^3=H_z^3\left(1+\frac{H_x^2}{H_z^2}\right)^{\frac{3}{2}}$$

$$H^3=H_z^3\left(1+\frac{3}{2}\frac{H_x^2}{H_z^2}+\frac{3}{8}\frac{H_x^4}{H_z^4}+\frac{1}{16}\frac{H_x^6}{H_z^6}+\cdots\right)$$

If now the electric field were varied as a function of $H_x$ so that $$V=V_0\left(1+\frac{H_x^2}{H_z^2}\right)^{\frac{3}{2}}$$

where $V_0$ is a constant, then $$\frac{H^3}{V}$$

would be constant and there would be no geometric distortion. Practically, it is sufficient to let $$V=V_0\left(1+\alpha\frac{H_x^2}{H_z^2}\right)$$

with $$\alpha=\frac{3}{2}$$

then:

$$\frac{H^3}{V}=\frac{H_z^3}{V_0}\left(1+\frac{3}{8}\frac{H_x^4}{H_z^4}-\frac{1}{2}\frac{H_x^6}{H_z^6}+\cdots\right)$$

$$\frac{H^3}{V}$$

is thus constant to the fourth order which is within the accuracy of the solutions for $\bar{x}_T$ and $\bar{y}_T$. So long as $$\frac{H_x}{H_z}<\frac{1}{5},\ \frac{H^3}{V}$$

according to the last equation will be constant to within 0.06 per cent. This is a negligible variation.

*(b) Correction of defocussing under deflection (first method)*

$H_z$ will normally be adjusted so that the term between the brackets in the expression for $\rho$ vanishes for some average or mean value of $v\cos\theta$, say $v\cos\theta=v_a$. There will be no defocussing due to deflection if for all $H_x$, $$\left[\left(\frac{H}{H_z}-\frac{2\pi}{\omega T_0}\right)-\frac{v_a}{\dot{z}_v}\right]=0$$

If, as above, the electric field is varied, $T_0$ and $\dot{z}_V$ will vary and these changes can be made to compensate for the changes in H. Since $$\omega T_0=\frac{eH}{m}\frac{2d}{\dot{z}_V}$$

the above equation may be written $$\frac{H}{H_z}-\frac{\pi m}{de}\frac{\dot{z}_V}{H}-\frac{v_a}{\dot{z}_V}=0$$

or $$\frac{H}{H_z}-\frac{H_z}{H}\frac{\dot{z}_V}{\dot{z}_{V_0}}\frac{\pi m}{de}\frac{\dot{z}_{V_0}}{H_z}-\frac{\dot{z}_{V_0}}{\dot{z}_V}\frac{v_a}{\dot{z}_{V_0}}=0$$

Now let $$V=V_0\left(1+\alpha\frac{H_x^2}{H_z^2}\right)$$

and let $\dot{z}_{V_0}$ be the value of $\dot{z}_V$ when $V=V_0$.

Since $$\dot{z}_V=\sqrt{2\left(\frac{e}{m}\right)V}$$

it follows that $$\left.\begin{aligned}&\frac{\dot{z}_V}{\dot{z}_{V_0}}=\sqrt{\frac{V}{V_0}}\cong 1+\frac{\alpha}{2}\frac{H_x^2}{H_z^2}\\ \text{Similarly}\quad&\frac{\dot{z}_{V_0}}{\dot{z}_V}\cong 1-\frac{\alpha}{2}\frac{H_x^2}{H_z^2}\\ &\frac{H}{H_z}=1+\frac{1}{2}\frac{H_x^2}{H_z^2}\\ &\frac{H_z}{H}=1-\frac{1}{2}\frac{H_x^2}{H_z^2}\end{aligned}\right]\ \text{Neglecting fourth order terms}$$

Thus the expression becomes:

$$1+\frac{1}{2}\frac{H_x^2}{H_z^2}-\left(1-\frac{1}{2}\frac{H_x^2}{H_z^2}\right)\left(1+\frac{\alpha}{2}\frac{H_x^2}{H_z^2}\right)\frac{\pi m}{de}\frac{\dot{z}_{V_0}}{H_z}-\left(1-\frac{\alpha}{2}\frac{H_x^2}{H_z^2}\right)\frac{v_a}{\dot{z}_{V_0}}=0$$

$$\left[1-\frac{\pi m}{de}\frac{\dot{z}_{V_0}}{H_z}-\frac{v_a}{\dot{z}_{V_0}}\right]+\frac{1}{2}\frac{H_x^2}{H_z^2}\left[1+(1-\alpha)\frac{\pi m}{de}\frac{\dot{z}_{V_0}}{H_z}+\alpha\frac{v_a}{\dot{z}_{V_0}}\right]=0$$

The first bracket must equal zero if the picture is to be in focus with no deflection. This requires that $$H_z=\frac{\pi m}{de}(\dot{z}_{V_0}+v_a)$$

The second bracket then becomes $$\left[1+(1-\alpha)\left(1-\frac{v_a}{\dot{z}_{V_0}}\right)+\alpha\frac{v_a}{\dot{z}_{V_0}}\right]$$

and is zero if $$\alpha=\frac{2-\frac{v_a}{\dot{z}_{V_0}}}{1-2\frac{v_a}{\dot{z}_{V_0}}}\cong 2\left(1+\frac{3}{2}\frac{v_a}{\dot{z}_{V_0}}\right)$$

since $$\frac{v_a}{\dot{z}_{V_0}}<<1$$

Thus for no defocussing under deflection, $\alpha\cong 2$, instead of $$\frac{3}{2}$$

as required for no geometric distortion. However, as may easily be seen, the use of $$\alpha=\frac{3}{2}$$

reduces the defocussing under deflection to one fourth of the value with $\alpha=0$.

(c) *Correction of geometric distortion (second method)*

It was shown above that geometric distortion can be substantially eliminated and at the same time defocussing of the image due to deflection can be substantially reduced by suitable modulation of the electric field in the dissector. Offhand, this would appear the simpler and more straightforward method. However, it is also possible to accomplish the same result by suitably modulating both the deflecting field and the focussing field, as will be shown. As before $$\bar{x}_T=d\frac{H_x}{H_z}$$

$$\bar{y}_T=\frac{d}{\pi}\frac{H_x}{H}\left(\frac{2\pi}{\omega_{T0}}\right)^2$$

$$\rho=2d\left[\left(\frac{H}{H_z}-\frac{2\pi}{\omega T_0}\right)-\frac{v\cos\theta}{\dot{z}_V}\right]\frac{v\sin\theta}{\dot{z}_V}$$

Let $H_l$ be a quantity to which the deflection is to be linearly proportional, and let $H_0$ be the value of $H_z$ when $H_l=0$. Further, let $$H_x=H_l\left(1+\alpha\frac{H_l^2}{H_0^2}\right)$$

For $\bar{x}_T$ to be linear in $H_l$ requires that $$H_z=H_0\left(1+\alpha\frac{H_l^2}{H_0^2}\right)$$

In other words both the deflecting and focussing fields must be modulated together.

Since $E_z$ is constant, $T_0$ is constant also and $\bar{y}_T$ will be linear in $H_l$ provided $$\frac{H_x}{\omega^2 H}$$

and hence $$\frac{H_x}{H^3}$$

is linear in $H_l$.

$$H^2=H_z^2+H_x^2$$

Neglecting fourth order terms and higher, then, $$H^2=(H_0^2+H_l^2)\left(1+2\alpha\frac{H_l^2}{H_0^2}\right)$$

$$H^2=H_0^2\left(1+(2\alpha+1)\frac{H_l^2}{H_0^2}\right)$$

and therefore $$\frac{H_x}{H^3}=\frac{H_l}{H_0^3}\,\frac{1+\alpha\frac{H_l^2}{H_0^2}}{1+\frac{3(2\alpha+1)}{2}\frac{H_l^2}{H_0^2}}$$

$$\frac{H_x}{H^3}=\frac{H_l}{H_0^3}\left[1+\left(\alpha-\frac{3(2\alpha+1)}{2}\right)\frac{H_l^2}{H_0^2}\right]$$

This expression will be linear in $H_l$ if $$\alpha-\frac{3(2\alpha+1)}{2}=0$$

$$\alpha=-\frac{3}{4}$$

*(d) Correction of defocussing under deflection (second method)*

Since $E_z$ is constant $\dot z_V$ will be constant also and there will be no defocussing under deflection if $$\frac{H}{H_z}-\frac{2\pi}{\omega T_0}$$

is constant. Now $$\frac{2\pi}{\omega T_0}=\frac{\pi m}{de}\frac{\dot z_V}{H}=\frac{\pi m}{de}\frac{\dot z_V}{H_0}\frac{H_0}{H}$$

For the image to be in focus with no deflection requires that $$\frac{\pi m}{de}\frac{\dot z_V}{H_0}=1-\frac{v_a}{\dot z_V}$$

Therefore $$\frac{H}{H_z}-\frac{2\pi}{\omega T_0}=\frac{H}{H_z}-\frac{H_0}{H}\left(1-\frac{v_a}{\dot z_V}\right)$$

$$=\left(1+\frac{1}{2}\frac{H_l^2}{H_0^2}\right)-\left(1-\frac{2\alpha+1}{2}\frac{H_l^2}{H_0^2}\right)\left(1-\frac{v_a}{\dot z_V}\right)$$

$$=\frac{v_a}{\dot z_V}+\frac{1}{2}\frac{H_l^2}{H_0^2}\left[1+(2\alpha+1)\left(1-\frac{v_a}{\dot z_V}\right)\right]$$

For $$\frac{H}{H_z}-\frac{2\pi}{\omega T_0}$$

to be constant requires that $$1+(2\alpha+1)\left(1-\frac{v_a}{\dot z_V}\right)=0$$

$$\alpha=-\frac{1-\frac{1}{2}\frac{v_a}{\dot z_V}}{1-\frac{v_a}{\dot z_V}}\cong-1+\frac{v_a}{\dot z_V}$$

Since $$\frac{v_a}{\dot z_V}<<1,\ \alpha\cong-1$$

Here, again, a different value of $\alpha$ is required than to eliminate the geometric distortion as in the first method; however, the use of the value of $\alpha$ to eliminate the geometric distortion reduces the defocussing by a factor of four over the case where no correction is used.

In the second method, just outlined, it has been assumed that the modulating factor is of the form $$1+\alpha\frac{H_l^2}{H_0^2}$$

Thus $$H_x=H_l\left[1+\alpha\frac{H_l^2}{H_0^2}\right]$$

and neglecting fourth order terms $$\frac{H_l^2}{H_x^2}=1-2\alpha\frac{H_l^2}{H_0^2}$$

So that $$1+\alpha\frac{H_l^2}{H_0^2}=1+\alpha\frac{H_x^2}{H_0^2}\left(1-2\alpha\frac{H_l^2}{H_0^2}\right)$$

$$1+\alpha\frac{H_l^2}{H_0^2}=1+\alpha\frac{H_x^2}{H_0^2}-2\alpha^2\frac{H_x^2H_l^2}{H_0^4}$$

The last term of this last expression is also of fourth order and therefore negligible. Therefore it is permissible to derive the correcting modulation from the (corrected) sweep fields as assumed in the disclosed embodiment of the second method.

There are then two methods of substantially eliminating the geometric distortion in a dissector tube employing uniform fields:

(1) Modulate the electric field by the factor $$\left(1+\frac{3}{2}\frac{H_x^2}{H_z^2}\right)\qquad(10)$$

(2) Modulate both the focussing and deflecting fields by the factor $$\left(1-\frac{3}{4}\frac{H_x^2}{H_0^2}\right)\qquad(11)$$

Of the two, method (1) is the simpler. As stated at the beginning of this analysis, $H_x$ is considered to be the total deflecting field. If $H_v$ is the vertical deflecting field and $H_h$ is the horizontal deflecting field, then, since these two fields are at right angles to each other, $H_x$ will at all times be given by $$H_x=\sqrt{H_v^2+H_h^2}$$

Thus to perform the required correction with either of the above two methods, it is necessary to derive a signal proportional to $$H_v^2+H_h^2$$

Figure 3:
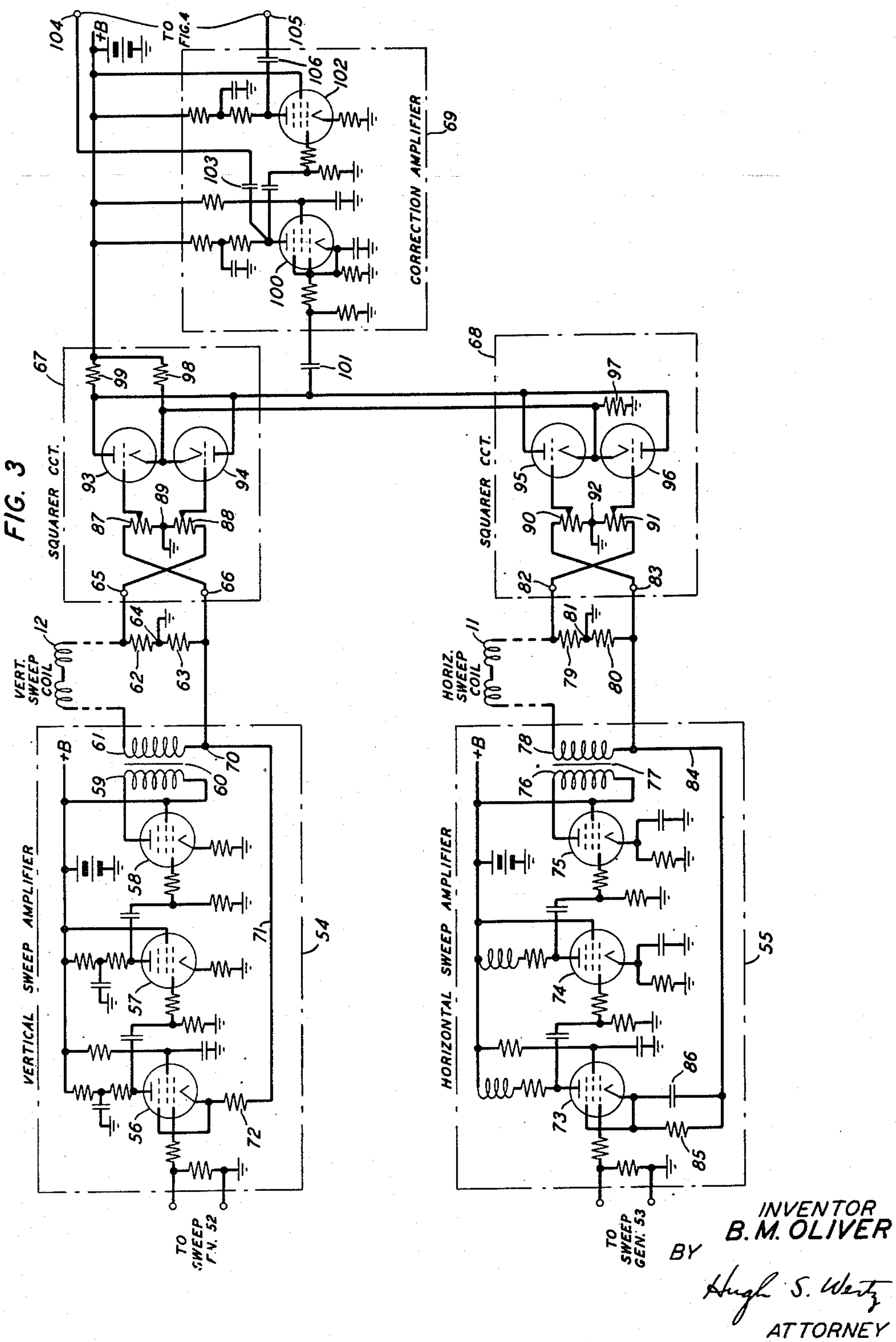
Fig. 3 is a circuit diagram of vertical and horizontal sweep amplifiers, squarer circuits and correction amplifier suitable for inclusion in the circuit shown in Fig. 1.
Figure 4:
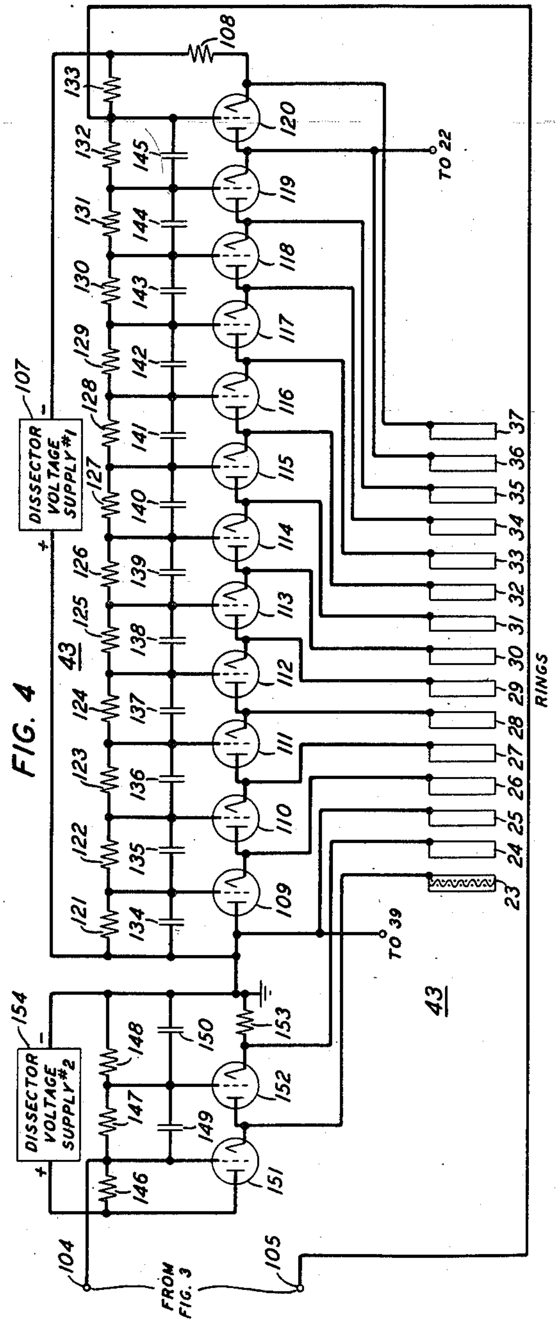
Fig. 4 is a circuit diagram of vacuum tube voltage divider circuits suitable for inclusion in the circuit of Fig. 1.

A block diagram of a system employing the first method of correction is shown in Fig. 1 while Figs. 2 to 4, inclusive, are circuit diagrams of portions of the circuit of Fig. 1 shown within dashed line rectangles in the latter figure. Vertical and horizontal synchronizing signals of any well-known type used in television systems are formed in generators 50 and 51, respectively, and applied to vertical and horizontal sweep generators 52 and 53, respectively. The devices 52 and 53 can be of any suitable type which produces a saw-toothed voltage wave. Such circuits are well known in the prior art and no detailed description thereof at this time is necessary. The output saw-toothed waves are applied to vertical and horizontal sweep amplifiers 54 and 55, respectively. Suitable vertical and horizontal sweep amplifiers are shown in Fig. 3.

The amplifier 54 is a three-stage, low frequency amplifier employing three tubes 56, 57 and 58, respectively. The saw-tooth wave output of the sweep generator 52 is applied to the control grid of the tube 56. The anode of the tube 58 is connected to the +B terminal through the primary winding 59 of a transformer 60, the secondary winding 61 of which is connected to the vertical sweep coil 12 associated with the tube 10. Included in the circuit with the sweep coil and the winding 61 are two equal, series-connected resistors 62 and 63, the common terminal 64 of which is connected to ground. The outer terminals of the resistors 62 and 63 are connected to the terminals 65 and 66 of the squarer circuit 67 the output of which, along with the output of squarer circuit 68, is applied to the connection amplifier 69. By using two equal resistors 62 and 63 with their common terminal 64 grounded, a balanced output voltage wave proportional to the sweep current, and hence to the sweep field intensity, is applied to the squarer circuit 67. One terminal 70 of the secondary winding 61 is connected through the connection 71 and resistor 72 to the cathode of the tube 56, thus providing negative feedback. This feedback tends to make the sweep current wave in the winding 12 faithfully correspond to the sweep voltage wave applied to the input of the tube 56.

The horizontal sweep amplifier 55 shown in

Fig. 3 is a high frequency amplifier and thus employs high frequency compensation. Otherwise it is quite similar to the vertical sweep amplifier 54. The output of the sweep generator 53 is applied to the control grid of the first of the three tubes 73, 74 and 75 making up the amplifier 55. As a practical matter, the second stage of this amplifier can comprise two tubes in parallel and the third stage can comprise three tubes in parallel. The anodes of the tubes 73 and 74 are connected, respectively, to the +B terminal through a resistor and an inductance member the purpose of which is to produce high frequency compensation. The anode of the tube 75 is connected to the +B terminal through the primary winding 76 of the transformer 77, the secondary winding 78 of which is connected in a series circuit including the horizontal sweep coil 11 and two equal, series-connected resistors 79 and 80, the common terminal 81 of which is connected to ground and the external terminals of which are connected to the two terminals 82 and 83 of the squarer circuit 68. The terminal 83 is also connected through the negative feedback connection 84 and the parallel-connected resistor 85 and condenser 86 to the cathode of the tube 73. This feedback connection tends to make the sweep current wave in the sweep coil 11 match the shape of the sweep voltage wave input to the amplifier 55.

Each squarer circuit, as shown in Fig. 3, comprises a two-tube arrangement, each tube operating on the curved portion of its characteristic so that the output wave is substantially the square of the input wave. The inputs of the two tubes are in push-pull and the outputs are in parallel. Connected across the terminals 65 and 66 is the double potentiometer represented by the resistors 87 and 88, the common terminal 89 of which is connected to ground. Similarly, connected across the terminals 82 and 83 is a double potentiometer comprising resistors 90 and 91, the common terminal 92 of which is also connected to ground. The inner variable terminals of the resistors 87 and 88, respectively, are connected to the control elements of tubes 93 and 94 while the inner variable terminals of the resistors 90 and 91 are connected, respectively, to the control elements of the tubes 95 and 96. The cathodes of all the tubes 93, 94, 95 and 96 are connected together and the common terminal is connected through a resistor 97 to ground. The common terminal of the cathodes is also connected through resistor 98 to the +B terminal. This causes all the cathodes to be biased until they are near the cut-off potential of the tubes, since the resistors 98 and 97 comprise a potentiometer connected between +B terminal and ground. All of the anodes of the tubes 93, 94, 95 and 96 are connected together and their common terminal is connected through resistor 99 to the +B terminal. The common terminal of the anodes is also connected through appropriate coupling members to the control grid of the tube 100 in the correction amplifier 69. The characteristic curve of each of the pairs of tubes 93, 94 and 95, 96 is a parabola (due to the fact that the two characteristic curves of each pair are added in reverse manner since the inputs are of opposite polarity and the outputs are added directly). Hence the unbalanced output of each pair of tubes is the square of the balanced input to that pair of tubes. Since the output currents of the squarers 67 and 68 are passed through the same load resistor 99, the output voltage applied to the coupling condenser 101 is proportional to the sum of the squares of the input voltages from the horizontal and vertical sweep amplifiers 54 and 55. By means of the movable terminals for the resistors 87, 88, 90 and 91, balanced gain control can be obtained.

The correction amplifier 69 comprises two tubes 100 and 102 to the former one of which the combined output of the squarer circuits 67 and 68 is applied. The anode of the tube 100 is coupled to the control element of the tube 102, and also through coupling condenser 103 to a terminal 104 of the vacuum tube voltage divider circuit 43 shown in Fig. 4 and which will be described in detail below. The anode of the tube 102 is connected to a terminal 105 of the voltage divider circuit 43 through a coupling condenser 106. The two outputs of the correction amplifier 69 are thus applied to the voltage divider circuit 43, so that a variable component can be applied to the rings 23 to 37, inclusive, in addition to the direct component also applied thereto from the voltage divider circuit. Because the terminals 104 and 105 of the correction amplifier 69 are connected to different stages thereof, the outputs are of opposite polarity (but they are not balanced due to the fact that there is gain in the second stage). The voltage divider circuit shown in Fig. 4 has a negative part (comprising the two tubes on the left and the circuits associated therewith, and a positive part (the rest of the circuit). The pick-up finger 39 and the ring 25 nearest it are connected to ground which is the potential of the terminal common to the left and right parts of the circuit 43.

A high voltage, direct current power supply 107 having its positive terminal grounded is associated with the positive part of the vacuum tube potentiometer circuit shown in Fig. 4. Between ground and the negative terminal of the power supply 107 are connected in series a resistor 108 and the anode-cathode circuits of a number of vacuum tubes 109 to 120, inclusive. The anode of tube 109 is connected to ground and each of the tubes 110 to 120, inclusive, has its anode connected to the cathode of the preceding tube. The cathode of tube 102 is connected through resistor 108 to the negative terminal of the power supply 107. As a result, the anode-cathode paths of the tubes 109 to 120, inclusive, are all in series and if no current is drawn by the grids of these tubes, or from any of the terminals of these tubes shown connected in Fig. 4 to rings 25 to 37, inclusive, the same plate current will flow in all the tubes.

The grid of each of the tubes 109 to 120, inclusive, is connected to the corresponding junction point between a pair of the resistors 121 to 133, inclusive, which resistors are connected in series between ground and the negative terminal of the high voltage supply. As a result, each grid of the series of tubes 109 to 120, inclusive, is placed at a more negative potential than the grid of the preceding tube, and if the resistors 121 to 132, inclusive, have equal resistances, the potential differences between the grids of successive tubes will all be equal and each will be equal to the potential difference between the grid of tube 109 and ground. Since the cathode potential of each tube, acting as a cathode follower, is only slightly more positive than the grid potential of the same tube, the potentials of the output terminals which are connected respectively to the cathodes of tubes 109 to 120, inclusive, form a set of potentials decreasing progressively from ground (potential of ring 25) to a large negative potential (potential of ring 37).

The common terminal of resistors 132 and 133 is connected to terminal 105 of the correction amplifier 69. Each of the resistors 121 to 132, inclusive, is shunted by a capacitor 134 to 145, respectively. If all the resistors 121 to 132, inclusive, are equal and all the capacitors 134 to 145, inclusive, are equal and large compared to the stray capacity of the grids of the tubes 109 to 120, respectively, then any alternating potential wave applied between terminal 105 and ground will appear in equal parts across each resistor-capacitor combination just as the total deflection of a coiled spring appears in part across each turn. The total alternating potential appearing on any grid will therefore be proportional to the number of resistor-capacitor combinations between that grid and ground and therefore also proportional to the direct potential of the grid. The superposed alternating potential variations of the grids are communicated to the output terminals, each tube acting as a cathode follower. By this means, the rings (25 to 35 inclusive) between the cathode 22 and the pick-up finger 39 have applied thereto direct voltages which are progressively less (more negative) in the direction of the cathode 20 and each ring has applied thereto a proportional alternating component which varies in accordance with the sum of the squares of the horizontal and vertical sweep voltages. The electric field formed by these ring voltages is extended beyond the cathode 22 by means of the ring 37 which is more negative than the cathode 22 and extended in the opposite direction beyond the pick-up finger 39 by means of the rings 24 and 23 to which are applied positive potentials with respect to that of the anode finger 39 by means of the left portion of the voltage divider circuit 43 shown in Fig. 4. The mesh cap 44 on or near the end wall of the tube 10 is placed at the same potential as the ring 23 and is used to prevent the electric field lines from curving up toward the ring 23. This makes possible a more uniform field distribution within the tube 10.

Referring now to the left portion of the voltage divider circuit of Fig. 4, the potentiometer comprising the resistors 146, 147 and 148 is connected between the plus terminal of a direct current supply 154 designated "Dissector Voltage Supply #2" (which is usually of lower voltage than the "Dissector Voltage Supply #1") and ground. The resistors 147 and 148 are respectively shunted by condensers 149 and 150. The terminal 104 is connected to the common terminal of resistors 146 and 147 and to the grid of a tube 151 the anode-cathode circuit of which is connected in a series circuit with the corresponding circuit of a tube 152 and a resistor 153 across this power supply 154. The common terminal of the resistors 147 and 148 is connected to the control element of the tube 152. The cathodes of the tubes 151 and 152 are respectively connected to the rings 23 and 24.

In the arrangement of Fig. 4, it will be noted that use is made of a cathode follower connection to remove output voltages. This has the effect of decreasing the impedance as seen by the rings of the dissector tube 10. Currents drawn by these rings in the dissector therefore have little effect on the potentials of the rings and the stray capacities have little shunting effect on the high frequencies contained in the alternating potential variations.

The operation of the system shown in Fig. 1 will now be described. An image of the object O is focussed upon the photo-electric cathode 22 by means of the lens system 38 and photoelectrons emitted from this cathode are formed into a beam having a cross-sectional area corresponding to that of the optical image. The potentials applied to the rings 23 to 35, inclusive, are sufficiently large to produce saturated photo-emission from the cathode 22. For example, the ring 35 nearest the ring 36 at cathode potential is placed at a potential of about 100 volts positive with respect to the cathode and the following rings have progressively larger potentials applied thereto, the difference between two successive rings being approximately 100 volts.

Since the rings in the dissector are uniformly spaced along the axis of the tube, a substantially uniform axial electric field is produced if the potential difference between adjacent rings is the same for all rings, and provided the cathode 22 and mesh cap 44 are respectively placed at the potentials of the rings having the same axial position. The potentiometer circuit of Fig. 4 and the construction of the tube 10 are such as to permit these conditions to be met. As the potentials of the ungrounded rings (and cathode and mesh cap) are varied in accordance with the input to the correction amplifier, all these potentials vary proportionately, so that while the electric field is made to vary in intensity with time, the field is always substantially uniform throughout the volume of the dissector.

The uniform axial field set up by the focussing coil 13 in cooperation with the substantially uniform electric field produced by the potentials applied to the conducting rings 23 to 37, inclusive, and the cathode 22 and mesh cap 44, bring the photo-electrons to a focus in the plane of the aperture in the pick-up member 39, thus forming an electron image of the object in this plane. The horizontal and vertical sweep coils 11 and 12 produce magnetic fields uniform in intensity throughout the dissector volume and in directions transverse to the axis of the dissector. Each field, which is continuously varying with time due to the saw-toothed current applied to the coils, sweeps the entire electron image across the aperture of the pick-up member 39, thereby allowing successive elements in the electron image to pass through the aperture. The output of the pick-up member 39 is amplified and prepared for transmission over the antenna 48 in a manner well known to the workers in the television art. If a motion picture film is the object O, one of the sweep coils is not used, one direction of the scanning being supplied by the motion of the film. Correction for distortion which would otherwise be present is obtained by applying the saw-toothed variations produced in the vertical and horizontal sweep amplifiers 54 and 55 to the squarer circuits 67 and 68, the outputs of which are added and applied to the amplifier 69 and the voltage divider 43 whereby the alternating components of the potentials applied to the rings 23 to 37, inclusive, are caused to vary in accordance with the sum of the squares of the two deflecting fields, or, in other words, in accordance with variations in $$H_z^2$$

Since $H_z$ is substantially a constant, it will be seen that the electric field is modulated in a manner indicated by mathematical expression (10) above, or, in other words, correction is obtained in accordance with the first method of eliminating geometric distortion.

Figure 5:
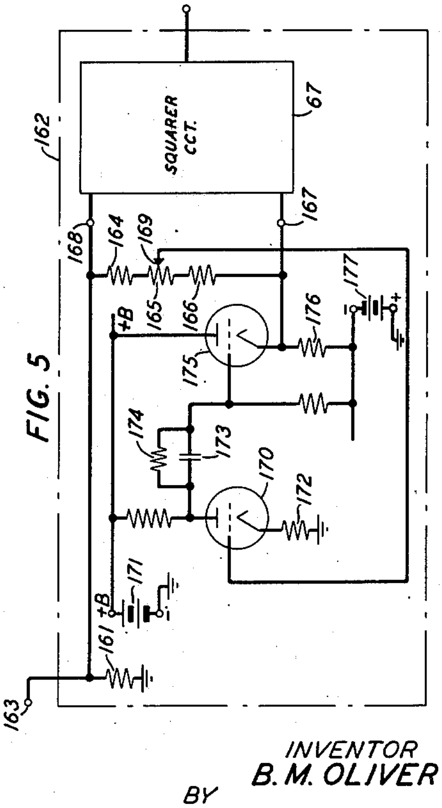
Fig. 5 is a diagram of a phase inverter circuit suitable for use in the circuit of Fig. 1 when the latter is slightly modified.

If, in the arrangement of Fig. 1, the balanced resistors 62 and 63 (or resistors 79 and 80) are replaced by a single resistor 161, producing an unbalanced voltage output, a phase-inverting circuit between this resistor and the input circuit of the squarer 67 (which is balanced) is necessary. While any suitable phase-inverter can be used, the circuit shown in Fig. 5 is a simple and convenient way of performing this function and it has the advantages that (1) the direct components of the signals are transmitted by the phase-inverting circuit and (2) that both sides of the balanced output produced are near ground potential. The elements within the box 162 in Fig. 5 can be used to replace those in the box 160 in Fig. 1.

In the arrangement of Fig. 5, unbalanced input signals are applied between the terminal 163 and ground. This terminal is connected to one end of a potentiometer comprising the resistances 164, 165 and 166, the other end of the potentiometer being connected to the output terminal 167 connected to the squarer circuit 67. The other output terminal 168 is connected directly to the input terminal 163. An inner variable tap 169 of the resistor 165 is connected to the control grid of the tube 170. The anode of this tube is connected through a resistor to the +B terminal of a suitable source 171 of direct potential of, for example, 300 volts. The cathode is connected through a resistor 172 to ground while the anode is connected through a coupling condenser 173 shunted by a resistor 174 which permits the passage of the direct components of the signal to the control element of the tube 175. The cathode of this tube is connected through the resistor 176 to the negative terminal of a suitable source of potential 177 of about 300 volts, the positive terminal of which is connected to ground. The anode of tube 175 is connected directly to the positive terminal of the source 171. The cathode of the tube 175 is connected directly to the terminal 167.

The operation of the circuit shown in Fig. 5 will now be described. Assume a small direct positive potential is applied between the input terminal 163 and ground. By means of the tap 169 on the resistor 165, a positive potential is applied to the input of the tube 170 which causes a negative potential to be applied to the grid of the tube 175. Because of the cathode follower output connection, the terminal 167 also assumes a negative potential. By properly adjusting the position of the tap 169 the output at the terminal 167 can be placed as far below ground as the input terminal 163 (and hence the output terminal 168) is above ground.

Figure 6:
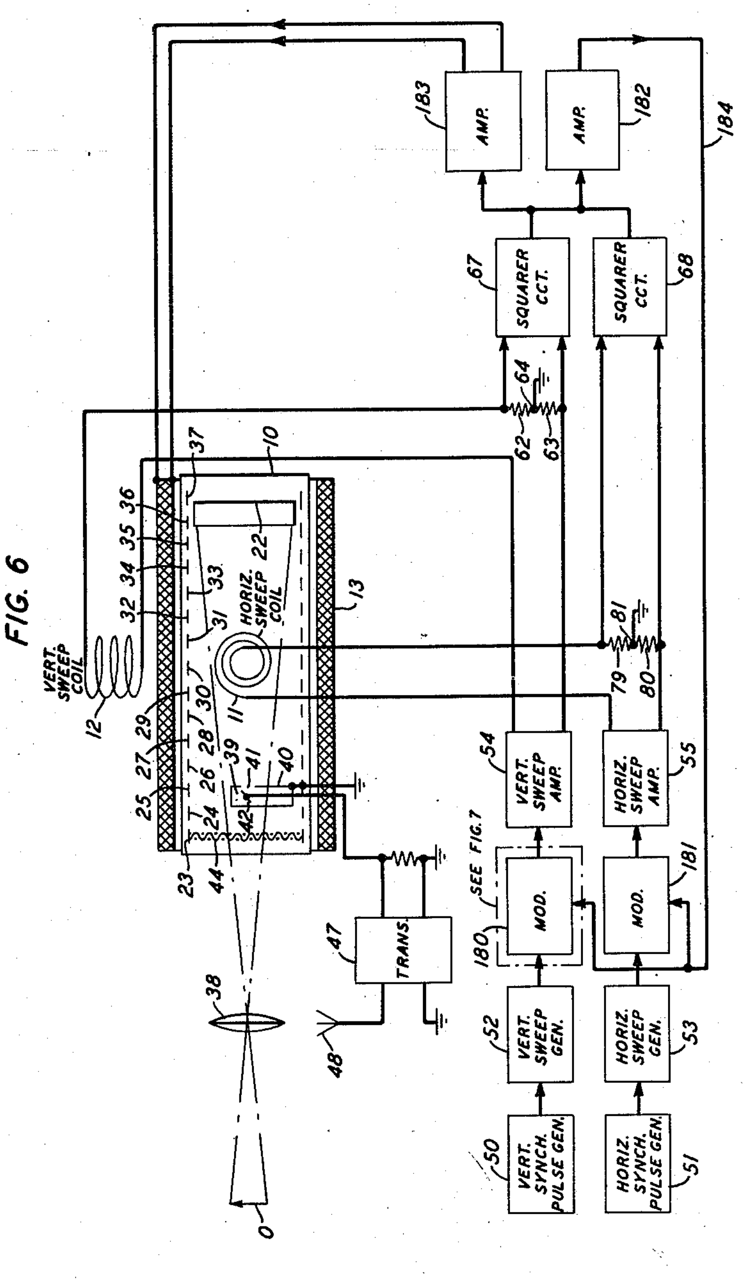
Fig. 6 is a schematic diagram of a modified circuit for eliminating or greatly reducing distortion in the dissector tube.

Fig. 6 shows a circuit diagram making use of the second method of correction, that is, both focussing and deflecting fields are modulated by a factor proportional to the sum of the squares of the two deflecting fields. The manner in which this produces correction is brought out by Equation 11 above. In the arrangement of Fig. 6, those elements which have similar characteristics to corresponding elements in Fig. 1 have been given the same reference characters as those of Fig. 1. The outputs of the vertical sweep generator 52 and the horizontal sweep generator 53 are applied respectively to modulators 180 and 181, the outputs of which are applied to the vertical and horizontal sweep amplifiers 54 and 55 shown in Figs. 3 and 4. As in Fig. 1, the outputs of these amplifiers are applied, respectively, to the vertical and horizontal sweep coils 12 and 11 and voltages proportional to the sweep currents are applied respectively to the input circuits of squarers 67 and 68, the outputs of which are combined and applied to an amplifier 182. These outputs are also combined and applied to an amplifier 183 which has its output circuit connected to the focussing coil 13. The output of the amplifier 182 is applied by means of the terminal 184 to the modulators 180 and 181. The amplifiers 182 and 183 are of any suitable type or types. A suitable modulator circuit for the member 180 or the member 181 is shown in Fig. 7.

Considering now the modulator shown in Fig. 7, the output of the sweep generator 52 is applied to the input winding 185 of a transformer 186, the secondary winding 187 of which has its outside terminals connected respectively to the control elements of the tubes 188 and 189 and its mid-terminal connected through a resistor to a point at +B potential. The anodes of the tubes 188 and 189 are connected respectively to the outer terminals of the primary winding 191 of a transformer 192, the secondary winding 193 of which is connected to the sweep amplifier 54 shown in Fig. 1. The mid-point of the transformer winding 191 is connected directly to the +B terminal. The cathodes of the tubes 188 and 189 are connected together and the common terminal is connected to ground through resistor 194. This common terminal is also connected to the output terminal of the amplifier 182. The signals applied to the cathodes of the tubes 188 and 189 modulate the input signals applied to the control elements of these tubes so that the vertical sweep amplifier 54, and hence the vertical sweep coil 12, has applied thereto signals which produce the desired deflection and also correct for the distortion in the manner indicated by Equation 11 above. Similarly, the modulator 181 receives signals from the horizontal sweep generator 53 and from the output terminal of the amplifier 182 and modulates the signals applied to the horizontal sweep coils 11 with the correcting signals. These correcting signals are also applied through the amplifier 183 directly to the focussing coil 13 so that a correcting component proportional to the sum of the squares of the deflecting voltages is applied to each of the deflecting coils 11 and 12 and to the focussing coil 13 to produce correction for geometric distortion in accordance with the second method (in the manner indicated in Equation 11). If desired, an auxiliary focussing coil, preferably having fewer turns than the main focus coil 13, can be connected to the amplifier 183 (instead of the main focus coil 13 shown in the drawing). The rings 23 to 37, respectively, of tube 10 have applied thereto the same direct components as in the arrangement of Fig. 1 but these components are not modulated with a correcting signal as in Fig. 1.

Various other modifications can be made in the various embodiments of the invention described above without departing from the spirit thereof, the scope of which is indicated in the claims.

What is claimed is:

1. In combination, a cathode ray television transmitter tube of the type containing a cathode and an anode and wherein a beam of relatively large cross-sectional area compared with the size of an elemental area of an object to be televised is formed, means for producing an electric field between said cathode and anode for accelerating said beam within said tube, means for forming a beam-focusing magnetic field, magnetic field-forming means for deflecting the beam in at least one coordinate direction, and means for greatly minimizing the image distortion normally produced in said tube comprising means for varying the strength of at least one of said fields by an amount proportional to the square of the total deflecting field.

2. In combination, a cathode ray television transmitter tube of the type containing a cathode and an anode and wherein a beam of relatively large cross-sectional area compared with the size of an elemental area of an object to be televised is formed, means for producing an electric field between said cathode and anode for accelerating said beam within said tube, means for forming a beam focusing magnetic field, magnetic field-forming means for deflecting the beam in at least one coordinate direction, and means for greatly minimizing the image distortion normally produced in said tube comprising means for varying the strength of the electric field by an amount proportional to the square of the total deflecting field.

3. In combination, a cathode ray television transmitter tube of the type containing a cathode and an anode and wherein a beam of relatively large cross-sectional area compared with the size of an elemental area of an object to be televised is formed, means for producing an electric field between said cathode and anode for accelerating said beam within said tube, means for forming a beam-focusing magnetic field, magnetic field-forming means for deflecting the beam in two coordinate directions at right angles to one another, and means for greatly minimizing the image distortions normally produced in said tube comprising means for varying the strength of the electric field by an amount proportional to the sum of the squares of the two deflecting fields.

4. In combination, a cathode ray television transmitter tube of the type containing a cathode and an anode and wherein a beam of relatively large cross-sectional area compared with the size of an elemental area of an object to be televised is formed, means for producing an electric field between said cathode and anode for accelerating said beam within said tube, means for forming a beam focusing magnetic field, magnetic field-forming means for deflecting the beam in at least one coordinate direction, and means for greatly minimizing the image distortion normally produced in said tube comprising means for varying the strength of both the focusing and deflecting fields in accordance with a function of the total deflecting field.

5. In combination, a cathode ray television transmitter tube of the type containing a cathode and an anode and wherein a beam of relatively large cross-sectional area compared with the size of an elemental area of an object to be televised is formed, means for producing an electric field between said cathode and anode for accelerating said beam within said tube, means for forming a beam-focusing magnetic field, magnetic field-forming means for deflecting the beam in two coordinate directions at right angles to each other, and means for greatly minimizing the image distortions normally produced in said tube comprising means for varying the strength of both the focusing and deflecting fields by an amount proportional to the sum of the squares of the two deflecting fields.

BERNARD M. OLIVER.

REFERENCES CITED

The following references are of record in the file of this patent:

UNITED STATES PATENTS

| Number | Name | Date |
|---|---|---|
| 2,084,509 | Seidelbach | June 22, 1937 |
| 2,131,563 | Knoll | Sept. 27, 1938 |
| 2,147,559 | Schlesinger | Feb. 14, 1939 |
| 2,178,093 | Zworykin et al. | Oct. 31, 1939 |
| 2,278,478 | Oliver | Apr. 7, 1942 |
| 2,407,458 | Spielman | Sept. 10, 1946 |
| 2,413,276 | Wolff | Dec. 24, 1946 |
| 2,418,133 | Miller et al. | Apr. 1, 1947 |
| 2,472,165 | Mankin | June 7, 1949 |